United States Patent Office 3,450,785
Patented June 17, 1969

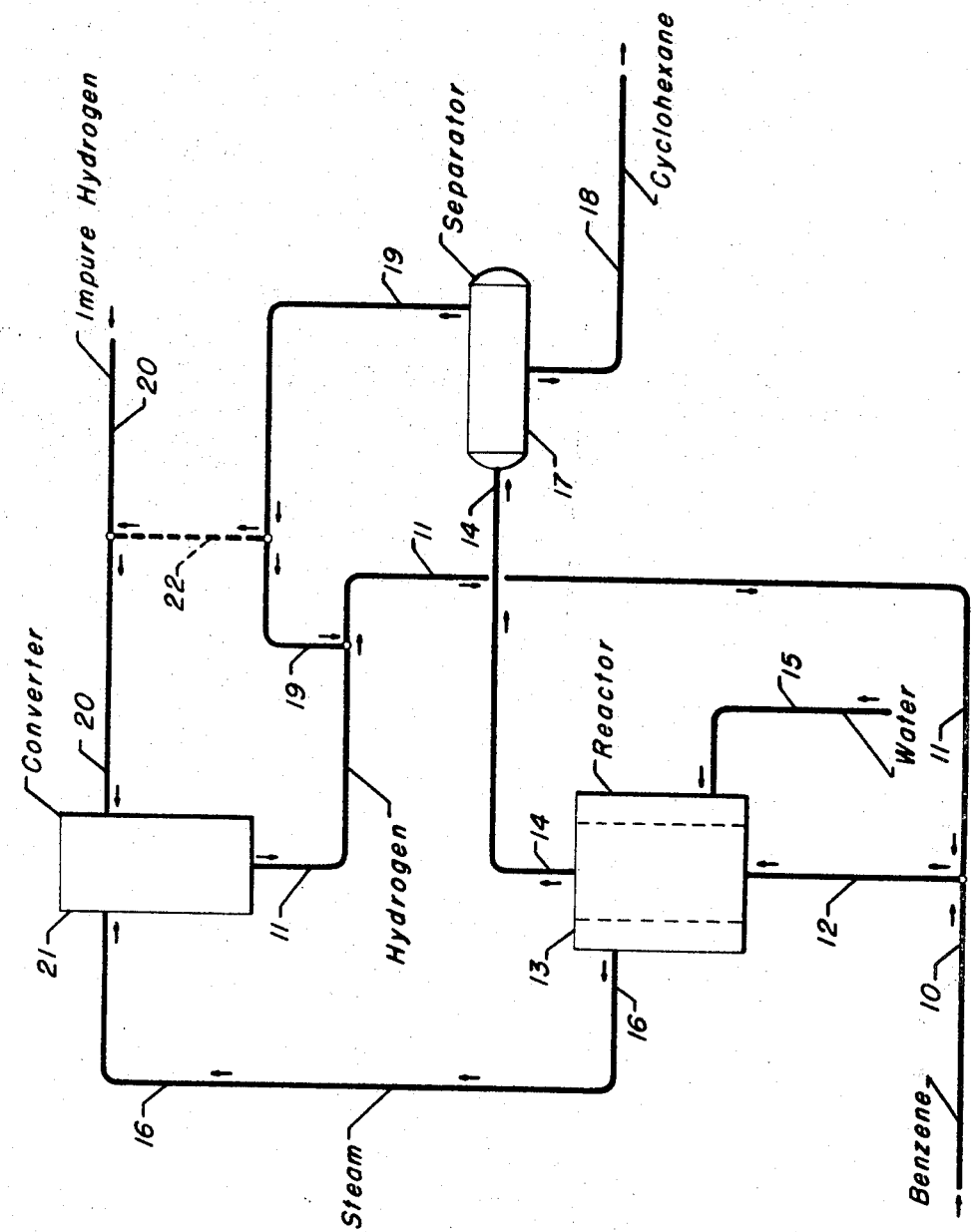

3,450,785
HYDROGENATION OF BENZENE TO FORM CYCLOHEXANE
Don B. Carson, Mount Prospect, Ill., assignor to Universal Oil Products Company, Des Plaines, Ill., a corporation of Delaware
Filed Dec. 30, 1966, Ser. No. 606,422
Int. Cl. C07c *5/10, 13/18*
U.S. Cl. 260—667                   4 Claims

ABSTRACT OF THE DISCLOSURE

A method for catalytically hydrogenating benzene to cyclohexane utilizing high purity hydrogen of consistent purity produced by steam-reforming an impure hydrogen stream and/or light gases.

---

This invention relates to a method for hydrocarbon conversion. It also relates to a method for producing cyclohexane via the catalytic hydrogenation of benzene. It specifically relates to a method for producing high-purity hydrogen for use in the hydrogenation reaction.

In brief, the present invention provides a method for converting hydrocarbons in the presence of hydrogen wherein the hydrogen used in the reaction is produced by steam-reforming the light gases separated from the effluent of the reaction zone. In other aspects of the invention includes a method for purifying hydrogen for use in a benzene hydrogenation reaction by steam-reforming an impure hydrogen stream in admixture with the light gases as hereinabove obtained. Specifically, steam which is used for the reforming operation is obtained via steam generation for removal of the exothermic heat of reaction from the benzene hydrogenation reaction zone.

It has long been known that cyclohexane could be prepared by the catalytic hydrogenation of benzene. Cyclohexane is desirable by industry for use in the production of nylon and other industrial products. Generally, the reaction is carried out by contacting benzene and hydrogen in a typical reaction zone under conditions sufficient to convert the benzene to cyclohexane with a minimum of side reactions. The source for the hydrogen used in the reaction is typically obtained from a petroleum hydrocarbon catalytic reforming operation for the production of gasoline boiling range product such as benzene, toluene, and xylene. In similar fashion, the benzene is obtained in high purity from such a catalytic reforming operation by means well-known to those skilled in the art. The catalytic hydrogenation of benzene to cyclohexane is achieved fairly easily at low temperatures and pressures typically about 500 p.s.i.g., and 400° F. of temperature. However, it is also known that the hydrogenation of benzene to cyclohexane evolves large quantities of heat which must be removed in order to control the reaction.

The prior art processes for the production of cyclohexane have realized that it is of utmost importance to utilize hydrogen which is relatively free of sulphur compounds. The presence of sulphur has the effect of degrading catalyst stability with attendant decrease in cyclohexane purity and yield. In addition, it has also been found that quantities of relatively high molecular weight hydrocarbon, such as toluene or other $C_{6+}$ hydrocarbons, has an adverse effect on the quantity of the cyclohexane produced. It is of importance that the cyclohexane have high purity, or otherwise the end product, such as for example, nylon will be of less quality than desired by those skilled in the art. Thus, as used in the prior art and as used herein, sulphur compounds are removed from the hydrogen stream by means well-known to those skilled in the art, such as for example, the process described in U.S. Patent Number 2,934,573 to Paulsen et al.

Therefore, it is an object of this invention to provide a method for hydrocarbon conversion.

It is also an object of this invention to provide a method for producing cyclohexane via catalytic hydrogenation of benzene.

It is a particular object of this invention to provide an improved method for producing cyclohexane from the catalytic hydrogenation of benzene which purifies the hydrogen reactant in a more facile and economical manner.

These objects and other advantages of the invention will become more clearly understood from the description presented hereinbelow with reference to the appended drawing which is a schematic diagram of apparatus for practicing one embodiment of this invention.

Therefore, in accordance with the practice of this invention, there is provided a method for hydrogenating benzene to cyclohexane which comprises the steps of: (a) introducing benzene into a catalytic hydrogenating reaction zone maintained in hydrogenating conditions including the presence of hereinafter specified hydrogen sufficient to produce an effluent from said zone containing cyclohexane; (b) absorbing exothermic heat of reaction from said zone by generation of steam using indirect heat exchange means; (c) subjecting hydrocarbons to catalytic reforming in the presence of said generated steam under conditions sufficient to produce a product stream comprising hydrogen; (d) passing said product stream into said reaction zone as specified; and (e) recovering cyclohexane in high concentration.

Another embodiment of this invention includes the method wherein an impure hydrogen stream containing relatively light hydrocarbons is subjected to said catalytic reforming of Step (c) in admixture with said hydrocarbons.

An illustrative embodiment of this invention includes the method wherein said impure hydrogen stream is off-gas from a petroleum hydrocarbon catalytic reforming operation for producing gasoline boiling range products.

The operating conditions for carrying out the catalytic hydrogenation of benzene to cyclohexane are well-known to those skilled in the art. Generally, these conditions include a mol ratio of hydrogen-to-benzene in the feed to the reactor fro m5:1 to 10:1, a weight hourly space velocity from 0.5 to 2, and a reactor inlet temperature from 90° F. to 400° F. with the reactor outlet temperature being controlled to less than 500° F. by the generation of steam therein. It has been found that if the feed temperature exceeds 400° F. the reaction temperature will be disproportionally higher because the feed will then be substantially all vapor and no cooling effect would be obtained from the vaporization of liquid portion of the feed. Preferably, the inlet temperature to the reactor is maintained at a temperature of about 100° F. and more specifically at a temperature of 90° F. The pressure in a recation zone is also maintained relatively low; that is a pressure of less than 500 p.s.i.g. is desirable with pressures in the neighborhood of 250 p.s.i.g. being satisfactory. The hydrogenation reaction is preferably catalytic with conventional platinum-type catalyst being satisfactory. Combinations of platinum and nickel are also satisfactory, with these noble metals being combined in any suitable manner in the form of pellets or granules and deposited on suitable supports, such as alumina, silica, zirconia, and the like.

As previously mentioned, the feed stock for the hydrogenation reaction is relatively pure benzene, and preferably is obtained from a petroleum hydrocarbon catalytic reforming operation by means well-known to those skilled in the art. Similarly, for economical purposes, makeup hydrogen to the present inventive process is also obtained from the same petroleum hydrocarbon catalytic reforming process.

Referring now to the drawing, the benzene-containing stream enters the process via line 10 where it is admixed with a hydrogen-containing stream from line 11. The benzene-hydrogen mixture passes via line 12 in to a catalytic reactor vessel 13 which is maintained under hydrogenating conditions sufficient to convert the benzene to cyclohexane. The heat of reaction is removed from the reaction zone by water which enters the reaction zone via line 15 and is converted thereby into steam which leaves reactor 13 via line 16 for use more fully described hereinbelow. An effluent stream containing cyclohexane and light hydrocarbons, if any, are removed from reactor 13 via line 14 and passed into separation zone 17. Separation zone 17 is maintained under conditions sufficient to separate a gaseous stream in line 19 comprising hydrogen and light hydrocarbons having from one to six carbon atoms per molecule. The desired cyclohexane product is removed from the separation zone 17 via line 18 in high concentration. An impure hydrogen stream preferably obtained from a petroleum hydrocarbon catalytic reforming operation is also passed into the process via line 20. In one embodiment of the invention, a mixture of hydrogen-containing streams (composed of at least a portion of the off-gas from separator 17 via line 22 and impure hydrogen entering via line 20) is passed into steam catalytic reformer converter 21. Preferably, however, the gaseous stream in line 19 is directly recycled to the reactor via line 22 in admixture with the product from converter 21.

Converter 21 is maintained under conditions sufficient to convert the light hydrocarbons in line 19 substantially into hydrogen gas. Steam in the proper proportion is added via line 16, and as has been previously noted, was generated by the vaporization by water in reactor 13. If needed, steam from an outside source may also be added to converter 21 by means not shown. Also as needed, additional hydrocarbons may be charged to converter 21 by means not shown. The gaseous product stream from converter 21 containing hydrogen is removed via line 11 and returned to reactor 13 in admixture with incoming feed in line 10 as previously discussed.

By operating in accordance with the above description, it has been found that cyclohexane is produced in high concentration in a more facile and economical manner than has heretofore been thought possible.

The production of hydrogen, per se, by the steam-reforming of hydrocarbons is well-known to those skilled in the art. For example, U.S. Patent Number 2,750,261 to Ipatieff et al. teaches a process for the production of hydrogen by the interaction of an aliphatic hydrocarbon and steam at elevated temperatures in the presence of catalytic material. As can be seen from the stoichiometry presented by the patentees, hydrogen and carbon dioxide are the sole products from the steam-cracking of hydrocarbons. Even though the early prior art processes were limited to the steam-cracking of methane, recent advances have provided techniques for the steam-cracking of liquid hydrocarbons, such as a naphtha fraction derived from petroleum. Therefore, the present invention is intended to embody the concept where, in addition to the light hydrocarbons present in line 19, referred to hereinabove, additional feed material such as light hydrocarbons and/or liquid hydrocarbons may be supplied to converter 21 as is well known to those skilled in the art in order to produce sufficient hydrogen to carry out the benzene hydrogenation reaction. Typically, hydrogen is produced in a converter such as 21 hereinabove, in a single stage at a temperature below 700° C. by using a molar ratio of steam to hydrocarbon of about 10 in the presence of a catalytic component comprising nickel. Those skilled in the art are familiar with the production of hydrogen and carbon dioxide in high concentration and therefore production of these components, per se, form no part of the invention except as otherwise interrelated and interdependently associated with the other aspects of the present invention.

The operating conditions to effect the production of hydrogen generally will utilize temperatures in the range of about 600° F. to 800° F. using space velocity based on methane equivalents per hour per volume of catalyst in the range of from 50 to about 1000. The amount of steam required to produce hydrogen is also well-known and frequently is expressed in terms of steam-to-carbon ratio which is the number of steam molecules charged to the reaction zone per atom of carbon charge. A satisfactory range of steam-to-carbon ratios will be from 1.5 to about 5 for the range of charge stocks contemplated herein. It is to be noted that the amount of steam generally can be totally produced by removing the heat of reaction in reactor 13. However, in some cases, excess steam may be produced which will be vented from the process by means not shown. On the other hand, should the heat of reaction in reactor 13 not be sufficient to produce sufficient steam in line 16, additional steam may be added to converter 21 by extraneous means not shown.

As indicated by the stoichiometry referred to in the Ipatieff et al. patent, supra, it is conventional to contact carbon monoxide produced from the reaction with a catalyst such as iron oxide to convert the carbon monoxide to carbon dioxide with an equivalent amount of hydrogen also being produced. The carbon dioxide may then be separted from the hydrogen by well-known means, e.g., absorption with an alkanolamine, such as triethanolamine. All of these auxiliary operations are embodied in the broad terminology of converter 21, such that only a hydrogen-containing stream is removed from converter 21 via line 11.

Usually, the purity of the hydrogen in line 11 will range from 80% to 98%. However, as is known by those skilled in the art, extremely high purity hydrogen may be obtained using cryogenic purification means such that the hydrogen in line 11 may be as high as 99+% by volume hydrogen. The hydrogen-containing stream leaving separator 17 via line 19 may be in the range of from 40% to 60% by volume hydrogen. The exact purity of the hydrogen in this stream, of course, depends upon the choice of operating conditions maintained in separator 17. In similar fashion, the impure hydrogen stream added to the process via line 20 may also be in the range from 40% to 65% hydrogen and in some cases may be as high as 85% or 90% hydrogen. The essence of the present invention, however, is embodied in the concept that regardless of the purity of the hydrogen streams in lines 19 and 20 the use of converter 21 purifies the hydrogen to a consistent purity for carrying out the hydrogenation of benzene to cyclohexane in reactor 13. Obviously, the economy of operation utilizing the steam generated in reactor 13 for reaction in converter 21 is a desirable one, and effects considerable advantages of the present invention over the prior art schemes.

The invention claimed:
1. Method for hydrogenating benzene to cyclohexane which comprises the steps of:
 (a) introducing benzene into a catalytic hydrogenation reaction zone maintained under hydrogenating conditions including the presence of hereinafter specified hydrogen sufficient to produce an effluent from said zone containing cyclohexane, hydrogen, and light hydrocarbons having from one to six carbon atoms per molecule;
 (b) absorbing exothermic heat of reaction from said zone by generation of steam by using indirect heat exchange means;
 (c) passing said effluent of Step (a) into a separation zone wherein a cyclohexane stream is separated from a stream comprising hydrogen and light hydrocarbons having from one to six carbon atoms per molecule;

(d) passing at least a portion of said stream containing hydrogen and light hydrocarbons in admixture with an impure hydrogen stream to catalytic reforming in the presence of said generated steam under conditions sufficient to produce a product stream comprising hydrogen;

(e) recycling said product stream of Step (d) to said catalytic hydrogenation reaction zone as specified; and, (f) recovering cyclohexane in high concentration.

2. Method according to claim 1 wherein said impure hydrogen stream is off-gas from a petroleum hydrocarbon catalytic reforming operation for producing gasoline-boiling range products.

3. Method according to claim 1 wherein said benzene is obtained from said reforming operation.

4. Method for hydrogenating benzene to cyclohexane which comprises the steps of:

(a) introducing benzene into a catalytic hydrogenation reaction zone maintained under hydrogenating conditions including the presence of hereinafter specified hydrogen sufficient to produce an exffluent from said zone containing cyclohexane, hydrogen, and light hydrocarbons having from one to six carbon atoms per molecule;

(b) absorbing exothermic heat of reaction from said zone by generation of steam by using indirect heat exchange means;

(c) passing said effluent of Step (a) into a separation zone wherein a cyclohexane stream is separated from a stream comprising hydrogen and light hydrocarbons having from one to six carbon atoms per molecule;

(d) passing a portion of said stream containing hydrogen and light hydrocarbons in admixture with an impure hydrogen stream to catalytic reforming in the presence of said generated steam under conditions sufficient to produce a product stream comprising hydrogen, and passing the remainder of said stream containing hydrogen and light hydrocarbons to admixture with said product stream;

(e) recycling said product stream of Step (d) to said catalytic hydrogenation reaction zone as specified; and, (f) recovering cyclohexane in high concentration.

References Cited

UNITED STATES PATENTS

| | | | |
|---|---|---|---|
| 2,934,573 | 4/1960 | Paulsen | 260—666 |
| 2,750,261 | 6/1956 | Tpatieff | 252—452 |

DELBERT E. GANTZ, *Primary Examiner.*

V. O'KEEFE, *Assistant Examiner.*

U.S. Cl. X.R.

260—666